(12) United States Patent
Markos

(10) Patent No.: US 8,205,367 B2
(45) Date of Patent: Jun. 26, 2012

(54) ASSOCIATIVE IMAGE APPARATUS

(76) Inventor: Nancy Markos, Hartland, WI (US)

( * ) Notice: Subject to any disclaimer, the term of this patent is extended or adjusted under 35 U.S.C. 154(b) by 147 days.

(21) Appl. No.: 12/717,797

(22) Filed: Mar. 4, 2010

(65) Prior Publication Data

US 2010/0223828 A1 Sep. 9, 2010

Related U.S. Application Data

(60) Provisional application No. 61/158,356, filed on Mar. 7, 2009.

(51) Int. Cl.
*G03B 25/02* (2006.01)
(52) U.S. Cl. ............... 40/454; 206/127; 206/735
(58) Field of Classification Search ............ 40/120; 206/766, 45.2, 45.21, 45.214, 45.25, 127, 206/765, 301, 18; 229/103
See application file for complete search history.

(56) References Cited

U.S. PATENT DOCUMENTS

| | | | |
|---|---|---|---|
| 1,272,618 A * | 7/1918 | Burgess | 206/735 |
| 2,414,671 A * | 1/1947 | Rosenthal | 206/45.21 |
| 2,631,046 A * | 3/1953 | Stephens | 283/56 |
| 2,684,757 A * | 7/1954 | Mccarthy | 206/736 |
| D255,308 S | 6/1980 | Jacoby et al. | |
| D289,111 S | 4/1987 | Barcus | |
| D306,661 S | 3/1990 | Sanford | |
| 5,283,967 A | 2/1994 | Abrams | |
| 5,359,374 A | 10/1994 | Schwartz | |
| D435,841 S | 1/2001 | Thousand | |
| 6,371,366 B1 * | 4/2002 | Edgerton et al. | 229/162.3 |
| D477,300 S | 7/2003 | Goodwin | |
| 6,845,583 B2 * | 1/2005 | Lee | 40/717 |
| 7,594,604 B2 * | 9/2009 | Haas | 235/380 |
| 7,779,996 B2 * | 8/2010 | Elias et al. | 206/45.23 |
| 2004/0248073 A1 * | 12/2004 | Pinkerman et al. | 434/308 |
| 2009/0238544 A1 * | 9/2009 | Orsini | 386/124 |

* cited by examiner

*Primary Examiner* — Lesley D. Morris
*Assistant Examiner* — Shin Kim
(74) *Attorney, Agent, or Firm* — Absolute Technology Law Group, LLC

(57) ABSTRACT

The present invention relates generally to the field of mounting devices for audio and visual components, and more specifically to an apparatus for displaying associative images and maximizing their cognitive effect on a user.

13 Claims, 5 Drawing Sheets

ASSOCIATIVE IMAGE APPARATUS

CROSS-REFERENCE TO RELATED APPLICATIONS

This application claims priority to U.S. Provisional Application No. 61/158,356 filed on Mar. 7, 2009.

FIELD OF INVENTION

The present invention relates generally to the field of mounting devices for audio and visual components, and more specifically to an apparatus for displaying associative images and maximizing their cognitive effect on a user.

DEFINITIONS

Figure 1:
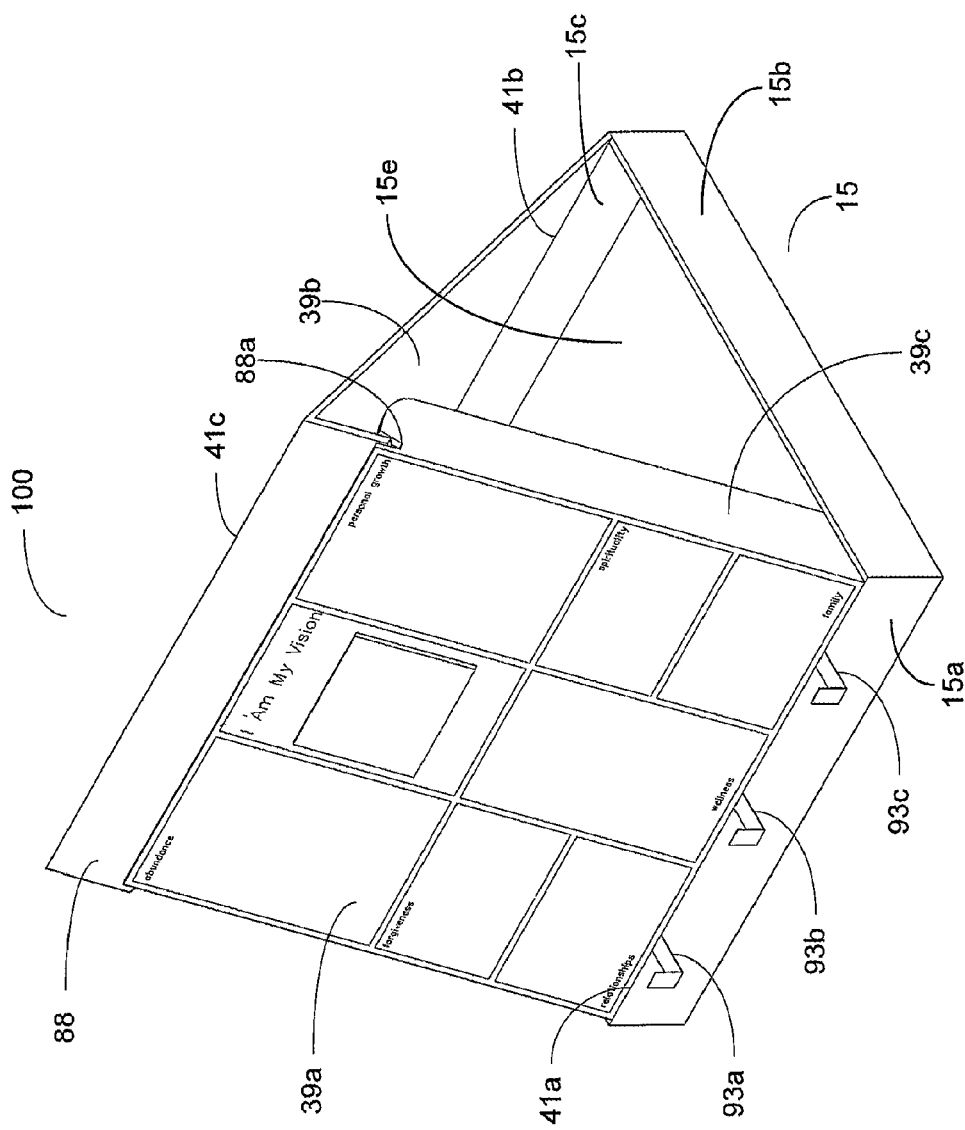
FIG. 1 illustrates an exemplary embodiment of an associative image apparatus.

As used herein, the term "visual stimulation" means the display of images which evoke a cognitive response, including conscious and subliminal responses As used herein, the term "associative image" means an image which has a special meaning or significance to a user.

As used herein, the term "associative image section" means a section of an associative image apparatus used to display associative images pertaining to a particular behavioral modification topic or user goal As herein "sectioned palette" refers to a surface for mounting associative images.

As used herein the term "self image display surface" to a mirror or a reflective surface made from paper, metal, glass, plastic, electronic display or a photographic image which displays a user's face or body.

As used herein the term "selectively attachable" means capable of being removed or placed without damages to the underlying surface or structure to which an object is being affixed.

As used herein, the term "vision board component" means a portable associative image palette which may be mounted on a wall or display apparatus. For example, a vision board component may be a foldable board or palette, or a palette with an electronic interface.

As used herein, the term "auditory stimulation component" means any apparatus capable of producing a sound or auditory stimulation.

BACKGROUND

Cognition is an interaction between knowledge-driven processes and sensory processes. Research has shown exposure to various stimuli, such as visual images, evokes measurable brain pattern changes and physiological responses in humans. Cognition and processing of images and visual stimulus can have a measurable effect on moods and performance of individuals.

Images processed by the human mind are stored as data to be consciously or subconsciously retrieved.

Several techniques are known in the art for exposing individuals to positive visual images to affect cognition, mood, motivation and achievement.

Most individuals have multiple personal issues, goals, esteem issues and behavioral issues which contribute to mood and levels of achievement.

Images that are displayed repeatedly may be recognized by the subconscious mind, evoking a subconscious response which may be a factor in how an individual responds to situations or stimuli (e.g., differentiating a product on a shelf based upon exposure to branded images).

Similarly, the display of positive images is shown to positively affect centers of the brain associated with mood and motivation causing many researchers to conclude that viewing of positive images affects a user's self esteem, confidence, motivation, mood and other components of cognitive processing associate with success and achievement.

A bestselling book, published in 2006 *The Secret* by Rhonda Byrne, has popularized the concept of altering one's own cognitive processes using positive visual stimulation using the concept of "vision boards."

The concept of a "vision board" is to create a self-affirming collage of visual images from various source that have motivating or self-affirming connotations unique to that individual, thus drawing upon existing scientific knowledge relating to exposure to visual images and cognitive response.

As described in *The Secret* and other literature, a "vision board", "treasure map" or "dream board" is typically a poster board on which an individual affixes images from varying sources to make a collage of associative images. For example, an individual may choose images of who he or she wants to become, what he or she wants to have, where he or she wants to live and vacation, and the life changes that will match those desires. Vision boards are intended to effect of add clarity to an individual's personal visions, and to help them to manifest these desires through "law of attraction."

Devices for combined pictures frames and mirrors, and audio devices, are known in the art. These mirror and picture frame combinations are designed to hold a certain number of pictures of specific sizes and shapes and the user is limited to the number and dimensions of the frames. The user will have to find pictures to fit the given frame dimensions or crop pictures to fit within the frame.

The prior art is also replete with literature and instruction as to how a user may create their own "home made" vision board using craft materials or posting electronic images on a designated website (.http://www.visualizeyourgoals.com/). For example, the website at christinekane.com/blog/how-to-make-a-vision-board/ explains to users how to create an associative image board by purchasing matte finish poster, compiling magazines, and buying a glue stick. Optionally, the user may "Leave a space in the very center of the associative image board for a fantastic photo of yourself where you look radiant and happy." The site also advises the user to "Hang your vision board in a place where you will see it often."

There are several problems known in the art with respect to creating an associative image board using off-the-shelf components not adapted for this use.

Traditional picture frames and electronic picture frames are generally not adapted to display multiple associative images and provide visual stimulus necessary to positively affect mood and behavior, nor are they adapted to enable the user to selectively mount and adapt multiple images and transport the apparatus as necessary.

Furthermore, devices such as electronic picture frames and bulletin boards do not contain visualization enhancements or formats specially adapted to maximize the behavioral impact of associative images.

It is desirable to have a versatile apparatus for transporting and storing vision board images, and for mounting and displaying a associative image board in a variety of settings (e.g., a wall, desk etc.) that appeals to a wide variety of users with varying levels of technical skills and storage/display space in their home, work and travel environments.

It is desirable to have a set of associative image display and storage components that can be cost-effectively mass produced and conveniently assembled by a user to create an aesthetically appealing associative image board having an integrated and finished appearance.

It is further desirable to have an associative image board apparatus upon which displayed images can be repeatedly be altered with out damaging the pictures.

It is further desirable to have an appealing background surface and complementary visual surface and/or auditory stimulation which maximizes the behavior-altering impact of associative images that are displayed.

It is further desirable to have an associative image board that allows the user to easily apply, move and remove images of various shapes and sizes without damaging the images or the board.

SUMMARY OF INVENTION

The present invention is an associative image board apparatus and system for creating one or more finished integrated vision boards and storing associative image board components. The invention facilitates mounting and display of a associative image board in a variety of locations, including but not limited to a wall, an office, an office cubicle, a bedroom, a desk, a bathroom, a bathroom stall or a car.

In various embodiments, the user may record his or her own voice stating their affirmations. Saying affirmations out loud, hearing them and replaying them through the use of the recording device reinforces the affirmations and imprints them in the subconscious mind.

DESCRIPTION OF EXEMPLARY EMBODIMENTS OF THE INVENTION

For the purpose of promoting an understanding of the present invention, references are made in the text hereof to embodiments of a universal mounting system. It should nevertheless be understood that no limitations on the scope of the invention are thereby intended. One of ordinary skill in the art will readily appreciate that modifications such as the dimensions, size, and shape of the components, alternate but functionally similar materials from which the associative image board is made, and the inclusion of additional elements are deemed readily apparent and obvious to one of ordinary skill in the art, and all equivalent relationships to those illustrated in the drawings and described in the written description do not depart from the spirit and scope of the present invention. Some of these possible modifications are mentioned in the following description. Therefore, specific details disclosed herein are not to be interpreted as limiting, but rather as a basis for the claims and as a representative basis for teaching one of ordinary skill in the art to employ the present invention in virtually any appropriately detailed apparatus or manner.

It should be understood that the drawings are not necessarily to scale, emphasis instead being placed upon illustrating the principles of the invention. In addition, in the embodiments depicted herein, like reference numerals in the various drawings refer to identical or near identical structural elements.

Moreover, the term "substantially" or "approximately" as used herein may be applied to modify any quantitative representation that could permissibly vary without resulting in a change in the basic function to which it is related.

FIG. 1 illustrates an exemplary embodiment of an associative image apparatus 100 which houses associative image board 10 (shown in FIG. 2).

In the embodiment shown, associative image apparatus 100 includes storage compartment 15, sectioned pallet 39, lid pivot point 41a, 41b an 41c. Locking flap 88 secures pivotal palette into place.

In alternative embodiments palette 39 may be non-pivotal or may be an electronic interface, and may have more or fewer defined sections.

Associative image apparatus may further include an internally stored vision board component (shown in FIG. 2a) which may be mounted on a wall or supported using a support apparatus. The embodiment shown further includes support component 93a, 93b and 93c. In various embodiments more or fewer support components may be used and constructed of metal, cardboard or plastic, and may be of any configuration or contour capable of supporting the edge of associative image board 10 in an upright position.

Figure 2A:
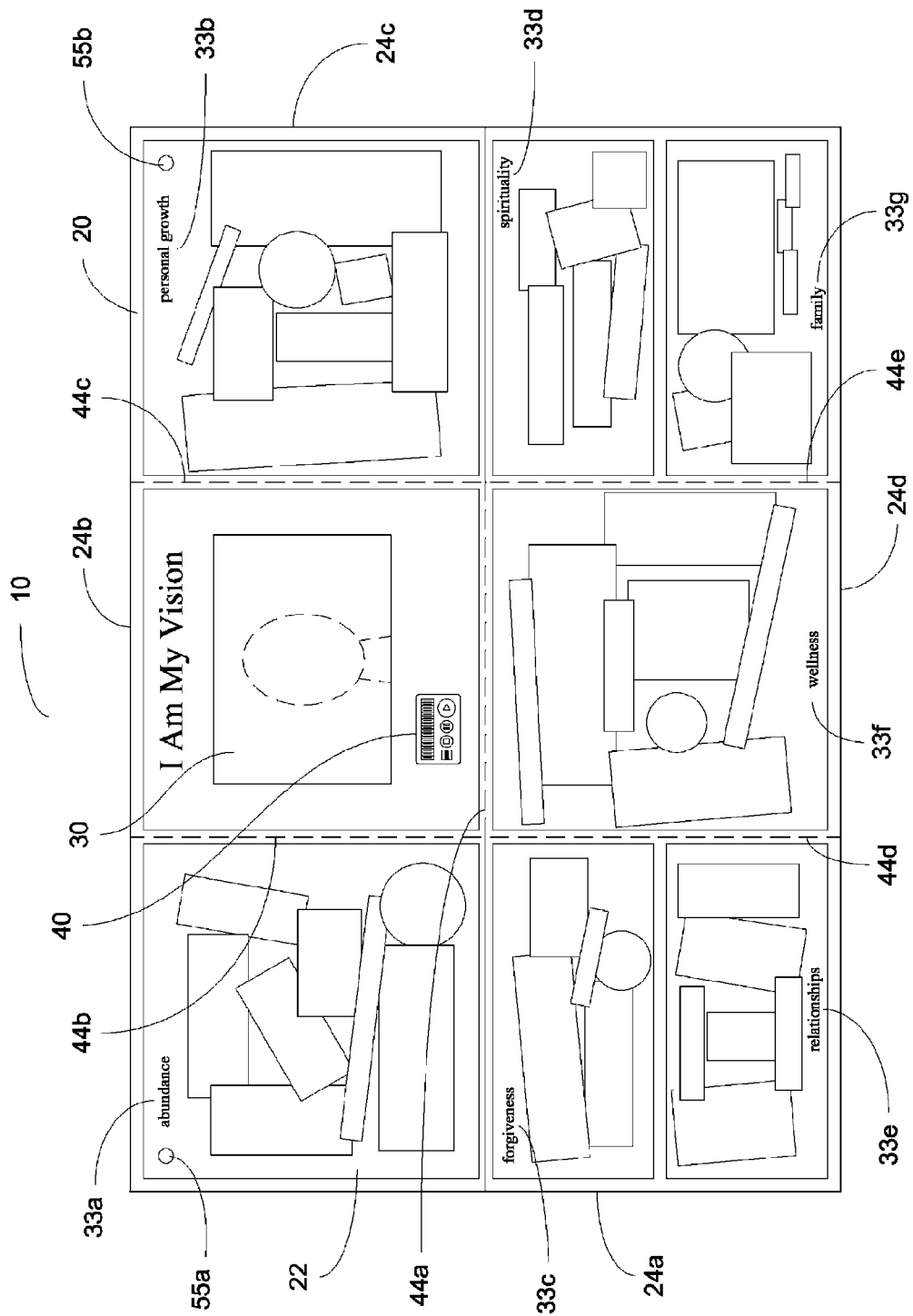
FIG. 2a illustrates an exemplary embodiment of associative image board having seven associative image sections.

FIG. 2a illustrates an exemplary embodiment of associative image board 10 to which a user has affixed their own images. In the embodiment shown, associative image board 10 is divided into various sections which are separated by foldable seams 44a, 44b, 44c, 44d and 44e, so that associative image board 10 can be conveniently folded and stored for transport, utilizing storage compartment 15 (illustrated in FIG. 1), and in the embodiment shown packaging is of a size designed to accommodate retail store shelving and display units.

In the embodiment shown, associative image board 10 which mounts to a wall includes mounting board 20 which in the embodiment shown is approximately 30"L×20"W and 1/16 to 2 inches, but may be of any size amenable to a vision board. The embodiment shown further includes apertures 55a and 55b for wall mounting; other embodiments may exclude apertures.

The embodiment shown includes topic labels 33a, 33b, 33c, 33d, 33e, 33f, and 34g which include words reflecting personal growth topics such as "abundance," "personal growth," "forgiveness," "spirituality," "relationships," "wellness," and "family."

Mounting board 20 further includes edges 24a, 24b, 24c and 24d which in the embodiment shown are wrapped or covered by front surface material 22 or back surface material 23 (not shown) to give a finished appearance. However, mounting board 20 need not be four-sided or rectangular. In the embodiment shown, mounting board 20 is constructed from chipboard material known in the art for manufacturing game boards. Multiple layers of material may be used, such as laminates, mattes, photographic material, weather proofing and materials to create a special effect or surface. In the embodiment shown, mounting board 20 is covered with front surface material 22 which includes a fabric or paper layer to which colored image, background print or photographic surface is affixed. Front surface material 22 may be comprised of fabric, paper or laminate paper, adhesive material, plastic or rubber, foam, cork or wood.

Mounting board 20 further includes back surface material 23 (not visible) which may be any fabric, paper or laminate paper, adhesive material, plastic or rubber, foam, cork or wood known in the art.

In other embodiments edges 24a, 24b, 24c and 24d may framed, trimmed, embellished, coated or left unfinished.

Associative image board 10 further includes reflective component 30 which may be a mirror, a reflective surface, reflective tape or reflective paper capable of reflecting a user's face. In the embodiment shown in FIG. 2a, reflective component 30 is a mirror securely affixed by an adhesive to mounting board 20. Reflective component may be of any dimensions, shape or material capable of reflecting a user's face, and of being affixed securely to mounting board 20.

In the embodiment shown in FIG. 2a, front surface material 22 of mounting board 20 includes delineated sections for pictures having various subject matter. For example, in the embodiment shown, lines or sections are printed on associative image board 10 to delineate areas for "abundance," "personal growth," "forgiveness," "spirituality," "relationships," "wellness," and "family." Other embodiments of associative image board 10 may display alternative topics, sections and subject matter delineations, and may include two or three-dimensional visual components for this purpose. An associative image board kit may include stickers or other components for delineating sections.

In the embodiment shown, associative image board 10 further includes audio component 40 which is a battery operated re-recordable or recordable device securely affixed to mounting board 20 by adhesive, placed in embedded recess or mounted or secured by any other means known in the art. In the embodiment shown audio component 40 is placed near mirror component 30, but may be placed anywhere on the front surface of associative image board 10. In various embodiments, audio component 40 may be activated and de-activated by pressing a button, flipping a switch or by a timer. In the embodiment shown, audio component 40 is designed to record voice messages, but other embodiments may be configured to replay music, sounds, or sounds of varying time lengths and pitch. In other embodiments, a video replay component (not shown) may accompany audio component.

Figure 2B:
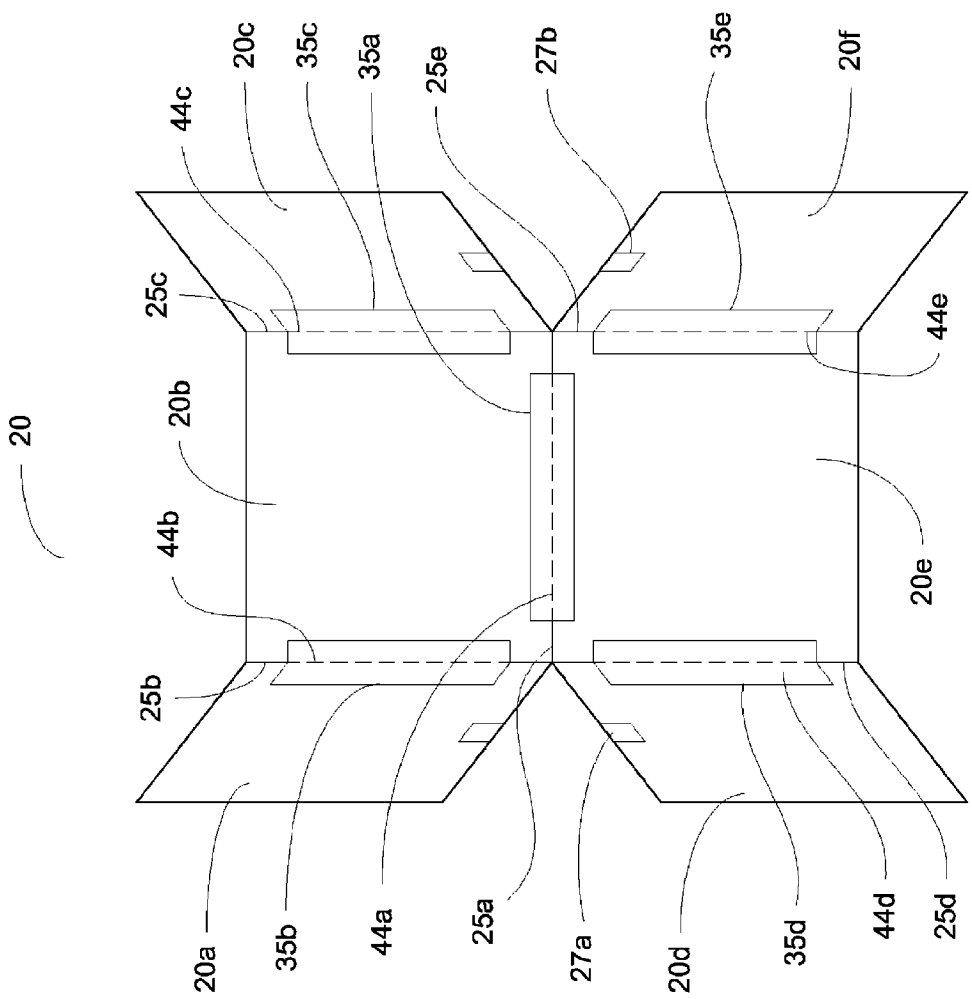
FIG. 2b illustrates an exemplary embodiment of associative image board which may be folded.

FIG. 2b further illustrates the foldable seams 44a, 44b, 44c, 44d and 44e which allow associative image board 10 to be folded and stored in associative image apparatus 100 storage compartment 15. FIG. 2b further illustrates an exemplary embodiment of a foldable vision board, which may be folded for compact storage and includes reinforcing edge components 35a, 35b, 35c, 35d, and 35e.

In the embodiment shown in FIG. 2b, mounting board 20 is constructed of multiple components (20a, 20b, 20c, 20d, 20e, and 20f) which are attached along edges (25a, 25b, 25c, 25d and 25e). In various embodiments, different combinations, numbers of mounting board components or edges may be attached or detached to each other to make mounting board 20 foldable or capable of being stored or displayed. In the embodiment shown edges 25a, 25b, 25c, 25d and 25e may be integrally constructed and folded (i.e., pivoted) along the seam of the fold or attached with a resilient material that forms a foldable seam. In other embodiments mounting board components (20a, 20b, 20c, 20d, 20e, and 20f) may be secured in the open position using securing components 27a, 27b, and 27c using fasteners, clips, metal or plastic brackets, or other securing components known in the art.

Figure 3:
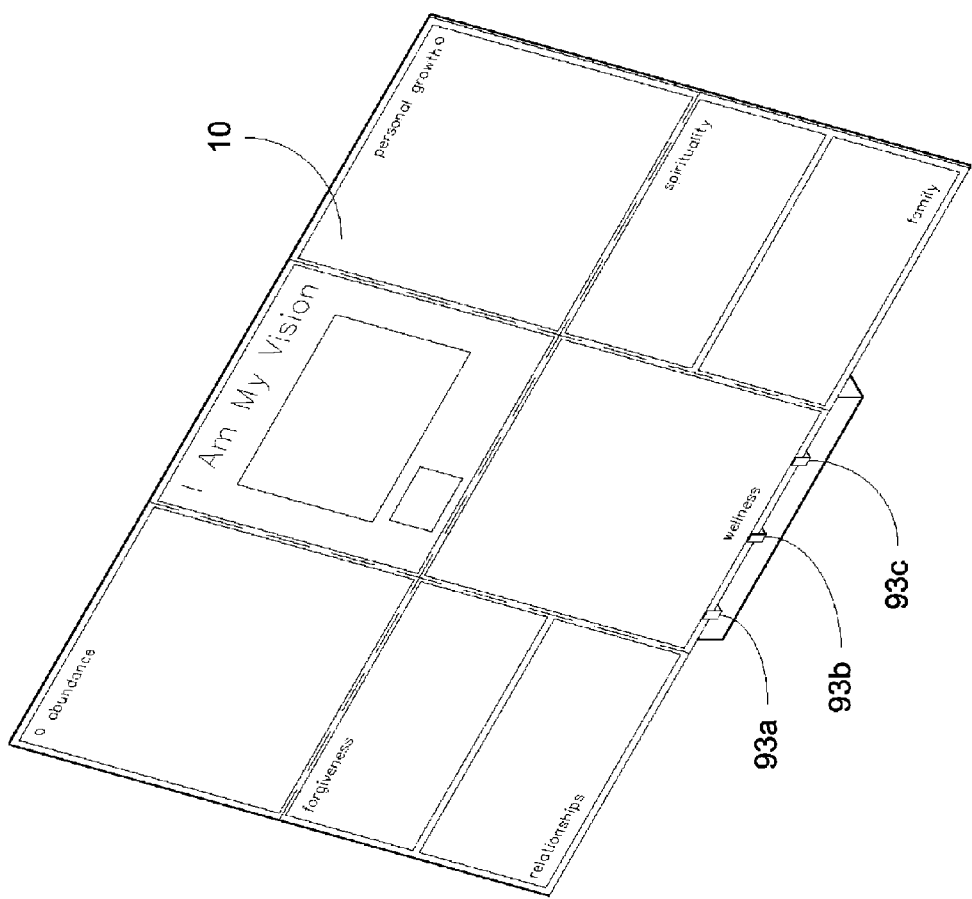
FIG. 3 illustrates an exemplary embodiment of associative image board which is mounted on an associative image apparatus.

FIG. 3 illustrates an exemplary embodiment of associative image board 10 which is mounted upright on palette 39 using support components 93a, 93b, and 93c to allow associative image board 10 to be displayed on a desk or other surface.

Figure 4:
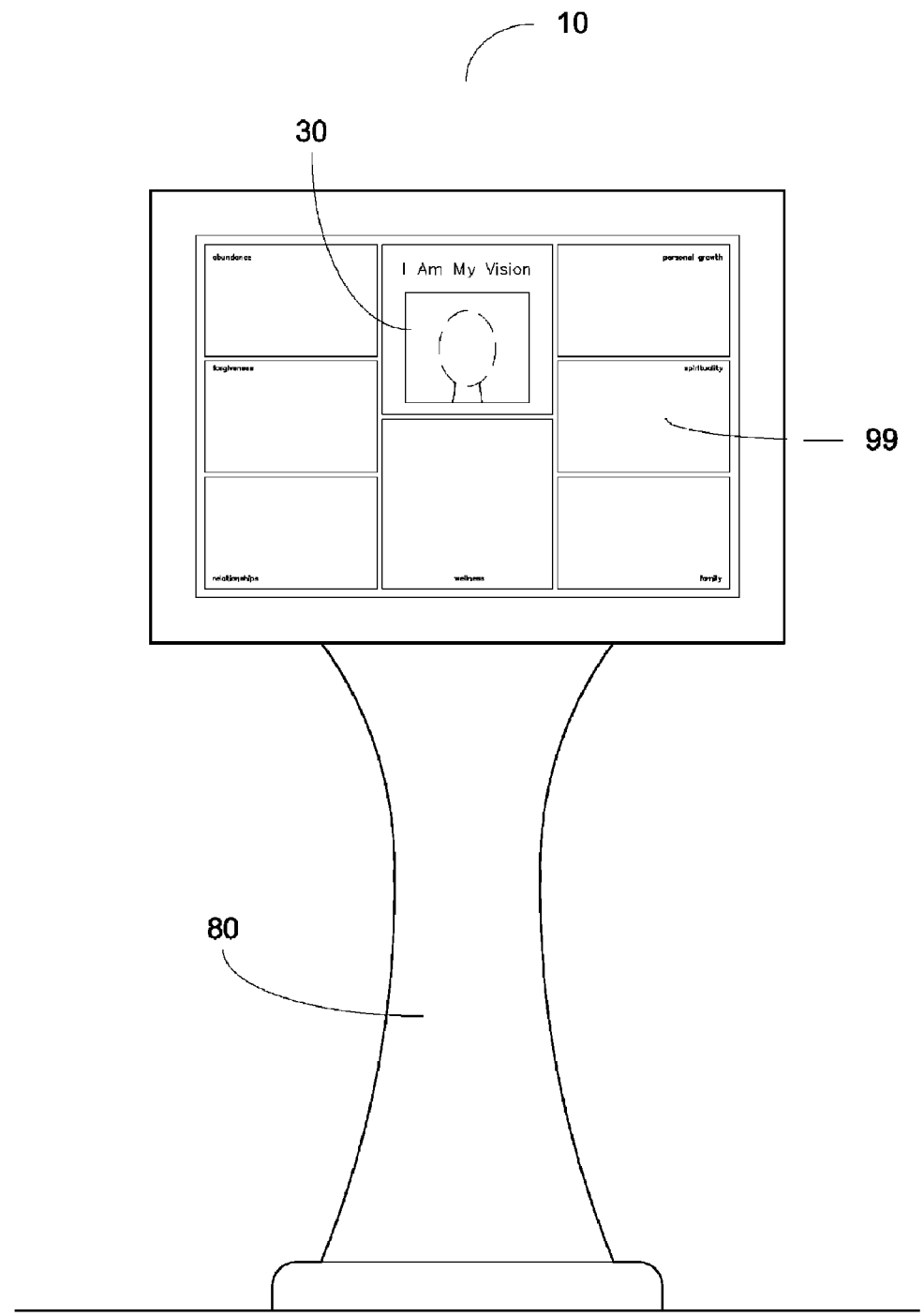
FIG. 4 illustrates an electronic format of associative image board.

FIG. 4 illustrates an electronic embodiment of associative image board 10 into which images are uploaded into a palette for electronic display and stored on an electronic media (not shown). Unlike other electronic image display devices, associative image board 10 displays associative images in a sectioned palette format 99 and includes reflective component 30 which may be a reflective component or an electronic self image uploaded into the palette. In various embodiments, stand 80 may be a floor stand of sufficient height to allow a user to conveniently look into reflective component 30.

The invention claimed is:

1. A visual stimulation apparatus comprised of:
   a sectioned mounting board packaging and display component which includes:
      a first side;
      a second side;
      a third side;
      a fourth side;
      a base;
      a storage compartment having a four sided box-shaped storage component having a lid comprised of pivotal sectioned front palette, a pivotal back palette component, wherein said pivotal back palette component further includes pivotal upper locking flap component;
      wherein said pivotal sectioned front palette further includes a perpendicular side flap, said side flap forming a plane perpendicular to said pivotal sectioned front palette;
      said pivotal sectioned front palette and said side flap further forming a slot;
      wherein said pivotal upper locking flap component may be selectively secured by said slot to secure said pivotal sectioned front palette and said pivotal back palette component for display;
      wherein said pivotal back palette component may be pivoted to a position parallel to said base and said side flap may be positioned within said storage compartment perpendicular to said base and so that said pivotal sectioned front palette operates as a lid with a sectioned palette display;
      three equidistant mounting board components, each of said equidistant mounting board components having a support surface parallel to said base and a support surface perpendicular to said base;
   a sectioned mounting board component having a plurality of defined sections comprised of a plurality of layers including at least one laminate surface layer, at least one chipboard layer and four covered edges;
      wherein said sectioned mounting board component further includes a plurality of foldable seams;
      wherein at least one section includes a second mirrored component;
      wherein at least one section further includes an audio recording component placed in the proximity of said mirrored component capable of recording a user's voice; and
   a plurality of stickers which may be removably attached to label one or more sections of said pivotal display panel and said sectioned mounting board component.

2. The apparatus of claim 1 wherein said mirrored component is a mirror.

3. The apparatus of claim 1 wherein said mirrored component is a reflective paper.

4. The apparatus of claim 1 wherein said mirrored component is an image stored on computer readable media and generated for display on said sectioned mounting board component.

5. The apparatus of claim 1 wherein said mirrored component is a holographic image.

6. The apparatus of claim 1 wherein said pivotal sectioned front palette and said sectioned mounting board component are electronic interfaces capable of displaying a plurality images loaded by a user into template capable of created said pivotal sectioned front palette and said sectioned mounting board component.

7. The apparatus of claim 1 wherein said storage compartment is comprised of a computer readable memory storage device.

8. The apparatus of claim 1 wherein said sectioned mounting board component is foldable.

9. The apparatus of claim 1 wherein said sectioned mounting board component further includes a self-image display component fixedly attached to said sectioned mounting board component.

10. The apparatus of claim 1 wherein said audio recording component is a re-recordable device is selectively attachable to at least one sectioned mounting board component.

11. The apparatus of claim 1 wherein said sectioned mounting board component is made of a material consisting of a group consisting of cardboard, wood, press board, cork, plastic, foam, layered paper, layered card board, pulp products, an electronic display interface and combinations thereof.

12. The apparatus of claim 1 wherein said sectioned mounting board component has a display surface treated with a sealing substance to that images may be temporarily adhered.

13. The apparatus of claim 1 wherein said plurality of stickers may be changed at selected time intervals using instructions stored on a computer readable media.

* * * * *